(12) United States Patent
Olsson (10) Patent No.: US 7,854,041 B2
(45) Date of Patent: Dec. 21, 2010

(54) HINGE MECHANISM FOR ELECTRONIC DEVICE

(75) Inventor: Mats K. Olsson, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1100 days.

(21) Appl. No.: 11/581,953

(22) Filed: Oct. 17, 2006

(65) Prior Publication Data

US 2008/0086841 A1 Apr. 17, 2008

(51) Int. Cl.
*E05F 1/08* (2006.01)
(52) U.S. Cl. .......................... 16/303; 16/330
(58) Field of Classification Search ........... 16/337–339, 16/342, 330, 303, 374, 376, 377, 340; 361/679.08, 361/679.12, 679.13, 379.15, 679.27, 679.28; 455/90.3, 575.1, 575.3, 575.8; 379/433.12, 379/433.13; 348/373, 333.01, 333.06, 794
See application file for complete search history.

(56) References Cited

U.S. PATENT DOCUMENTS

| | | | |
|---|---|---|---|
| 5,027,394 A | | 6/1991 | Ono et al. |
| 5,141,446 A | * | 8/1992 | Ozouf et al. ............... 439/165 |
| 5,436,954 A | * | 7/1995 | Nishiyama et al. .......... 455/566 |
| 5,937,062 A | * | 8/1999 | Sun et al. .................. 379/433.13 |
| 6,266,238 B1 | * | 7/2001 | Paulsel et al. ............. 361/679.27 |
| 6,766,180 B2 | | 7/2004 | Doraiswamy et al. |
| 6,990,711 B2 | | 1/2006 | Koshikawa et al. |
| 7,027,845 B2 | | 4/2006 | Sudo |
| 7,076,280 B2 | | 7/2006 | Oshima |
| 2005/0213307 A1 | * | 9/2005 | Pan .............................. 361/749 |
| 2005/0220294 A1 | * | 10/2005 | Gupte ....................... 379/433.13 |
| 2005/0250560 A1 | * | 11/2005 | Gupte et al. ............... 455/575.3 |
| 2005/0261041 A1 | | 11/2005 | Im |
| 2005/0266901 A1 | * | 12/2005 | Pan .......................... 455/575.3 |
| 2006/0059659 A1 | | 3/2006 | Kim et al. |

(Continued)

FOREIGN PATENT DOCUMENTS

WO 2008016751 2/2008

OTHER PUBLICATIONS

International Search Report and Written Opinion from corresponding International Application No. PCT/IB07/000995.

(Continued)

*Primary Examiner*—Chuck Y. Mah
(74) *Attorney, Agent, or Firm*—Renner, Otto, Boisselle & Sklar, LLP (57) ABSTRACT

A hinge for an electronic device, such as mobile radio terminal, is a two-part hinge with a top tube on a top half of the device, a bottom tube on a bottom half of the device, and a hinge assembly in the top tube and the bottom tube. The top tube and the bottom tube together extend across substantially all of a hinge connection width, and may extend across substantially all of a device width of the electronic device. The hinge assembly extends across at least most of the hinge connection width, such as extending across at least 90% of the hinge connection width. The hinge assembly includes a flexible film ribbon connector for making electrical connections between the top part and the bottom part of the electronic device. The flexible film is wrapped around a shaft of the hinge assembly.

20 Claims, 4 Drawing Sheets

U.S. PATENT DOCUMENTS

| | | | |
|---|---|---|---|
| 2006/0112519 A1* | 6/2006 | Harmon et al. | 16/367 |
| 2006/0174443 A1* | 8/2006 | Takagi et al. | 16/330 |
| 2008/0000049 A1* | 1/2008 | Moskowitz et al. | 16/330 |
| 2008/0026802 A1* | 1/2008 | Carlson | 455/575.1 |

OTHER PUBLICATIONS

International Preliminary Report on Patentability from corresponding International Application No. PCT/IB07/000995.

* cited by examiner

HINGE MECHANISM FOR ELECTRONIC DEVICE

TECHNICAL FIELD OF THE INVENTION

The present invention relates to hinge mechanisms for electronic devices.

DESCRIPTION OF THE RELATED ART

Mobile and/or wireless electronic devices are becoming increasingly popular. For example, mobile telephones, portable media players and portable gaming devices are now in widespread use. In addition, features associated with certain types of electronic devices have become increasingly diverse. To name a few examples, many electronic devices have cameras, text messaging capability, Internet browsing capability, electronic mail capability, video playback capability, audio playback capability, image display capability and handsfree headset interfaces.

Such electronic devices often have multiple portions that are hingedly coupled together. The device can be in a closed state, such that operative parts like a screen and a keypad are protected, or in an open state for operation. The hinges for such devices, such as mobile radio terminals, have generally utilized a three-part configuration, with parts on both ends of one of the portions located outboard of a single separate central part on the other of the portions. An example of such a three-part configuration is shown in U.S. Pat. No. 7,076,280.

SUMMARY

To improve electronic devices in general, and mobile radio terminals in particular, it would be desirable to improve the hinge mechanisms linking parts or halves of the devices. A two-part hinge represents an improvement over a three-part configuration in many respects. A two-part hinge involves fewer parts, reducing complexity, cost, and the number of potentially breakable parts. A two-part hinge is easier to seal against dirt, moisture, and other contaminants. In addition, a two-part hinge may allow for smaller hinge mechanisms. Two-part hinges may also have aesthetic advantages, due to novelty or other features.

According to an aspect of an embodiment of the invention, an electronic device has a two-part hinge.

According to another aspect of an embodiment of the invention, an electronic device has a two-part hinge that extends across substantially all of a local device width at the hinged end of the device.

According to yet another aspect of an embodiment of the invention, an electronic device has a flexible film ribbon connector that passes through a hinge mechanism linking two halves of the device, to electrically couple components of the two halves. The flexible film may pass through a passage within tube portions of the device halves. The film may wrap around part of a hinge assembly in the tube portions, such as by wrapping around a reduced-diameter portion of a shaft of the hinge assembly. The passage within the tube portions may be sealed with regard to contaminants by overlapped ends of the tube portions, and by press fit connections between the hinge assembly and the tube portions.

According to still another aspect of an embodiment of the invention, an electronic device includes: a top half having a top half tube; a bottom half having a bottom half tube; and a two-part hinge connection between the top half and the bottom half. The hinge connection includes: the top half tube; the bottom half tube; and a hinge assembly extending into the top half tube and the bottom half tube. The top half tube and the bottom half tube together extend across substantially all of a hinge connection width of the hinge connection. The electronic device may be a mobile radio terminal. The hinge connection width may be substantially the same as a local width of the electronic device at an end of the electronic device where the hinge connection is located. The hinge connection width may be substantially the same as an overall width of the electronic device. The hinge assembly may have a hinge assembly length in an axial direction that is at least 90% of the hinge connection width. The hinge assembly may be secured in the tubes by a retaining pin.

The top half tube and the bottom half tube may interfit together with overlapped ends. The hinge assembly may be press fit into respective passages in both the top half tube and the bottom half tube. The device may also include a flexible film electrical connector that electrically coupled the top half and the bottom half, wherein the flexible film connector runs through a central tube passage within the tubes. The central tube passage may be enclosed by the overlapped ends of the tubes, by a first press fit connection between the hinge assembly and the top half tube, and by a second press fit connection between the hinge assembly and the bottom half tube. The flexible film electrical connector may wrap around a shaft of the hinge assembly. The flexible film electrical connector may wrap around a narrowed central portion of the shaft that is narrower than adjoining shaft portions at respective ends of the narrowed central portion.

The hinge assembly may include: a shaft; a collar around the shaft; a detent mechanism that engages to releasably secure the hinge mechanism one of in a pair of positions; and a coil spring around the shaft, wherein the coil spring biases the detent mechanism toward engagement. The detent mechanism may include: a shaft insert that fits into a recess in a portion of the shaft; and a collar insert that fits into a pair of cutouts in the collar. One of the inserts may have at least one raised shape that releasably engages at least one shaped recess in the other of the inserts. The at least one raised shape may include a wedge shape protrusion, and the at least one shaped recess may include a wedge shape recess. The shaft may be press fit into one of the tubes, and the collar may be press fit into the other of the tubes.

According to a further aspect of an embodiment of the invention, an electronic device includes: a top half having a top half tube; a bottom half having a bottom half tube; a hinge connection between the top half and the bottom half, wherein the hinge connection includes: the top half tube, the bottom half tube, and a hinge assembly extending into the top half tube and the bottom half tube; and a flexible film electrical connector partially within the tubes, wherein the flexible film electrical connector provides an electrical connection between the top half and the bottom half. The flexible film electrical connector may be wrapped around a shaft of the hinge assembly. The flexible film electrical connector may wrap around a narrowed central portion of the shaft that is narrower than adjoining shaft portions at respective ends of the narrowed central portion. The electronic device may be a mobile radio terminal.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In the annexed drawings, which are not necessarily to scale.

DETAILED DESCRIPTION OF EMBODIMENTS

A hinge for an electronic device, such as mobile radio terminal, is a two-part hinge with a top tube on a top half of the device, a bottom tube on a bottom half of the device, and a hinge assembly in the top tube and the bottom tube. The top tube and the bottom tube together extend across substantially all of a hinge connection width of the hinge, and may extend across substantially all of a device width of the electronic device. The hinge assembly extends across at least most of the hinge connection width, such as extending across at least 90% of the hinge connection width. The hinge assembly includes a flexible film ribbon connector for making electrical connections between the top part and the bottom part of the electronic device. The flexible film is wrapped around a shaft of the hinge assembly. Ends of the flexible film pass through slots in the top tube and the bottom tube, and are connected to electrical and/or electronic elements in the halves of the electronic device.

An embodiment of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication apparatus or the like.

Referring initially to FIGS. 1-4, a hinge assembly 10 is shown. The hinge assembly 10 is part of a two-part hinge connection 12 to link together a top half 14 and a bottom half 16 of an electronic device 20. The electronic device 20 is illustrated as a mobile telephone, but it will be appreciated that the electronic device 20 alternatively may be other types of electronic devices. The hinge connection 12 includes a top half tube 24, part of the top half 14, and a bottom half tube 26, part of the bottom half 16. Although the tubes 24 and 26 are oriented in a side-by-side configuration, the top half tube 24 is sometimes referred to herein as the top tube 24, and the bottom half tube 26 is sometimes referred to herein as the bottom tube 24. The hinge connection 12 is a two-part hinge connection in that it has two external parts, the tubes 24 and 26, in contrast to the three-part hinge connections utilized in prior art devices. The tubes 24 and 26 together extend across substantially all of a hinge connection width 30 of the hinge connection 12. The hinge connection width 30 may be substantially the same as a local device width 32 of the electronic device 20 at the end of the device where the hinge connection 12 is located. The local device width 32 may be less than or substantially the same as an overall device width 36 of the electronic device 20.

Figures 1, 2:
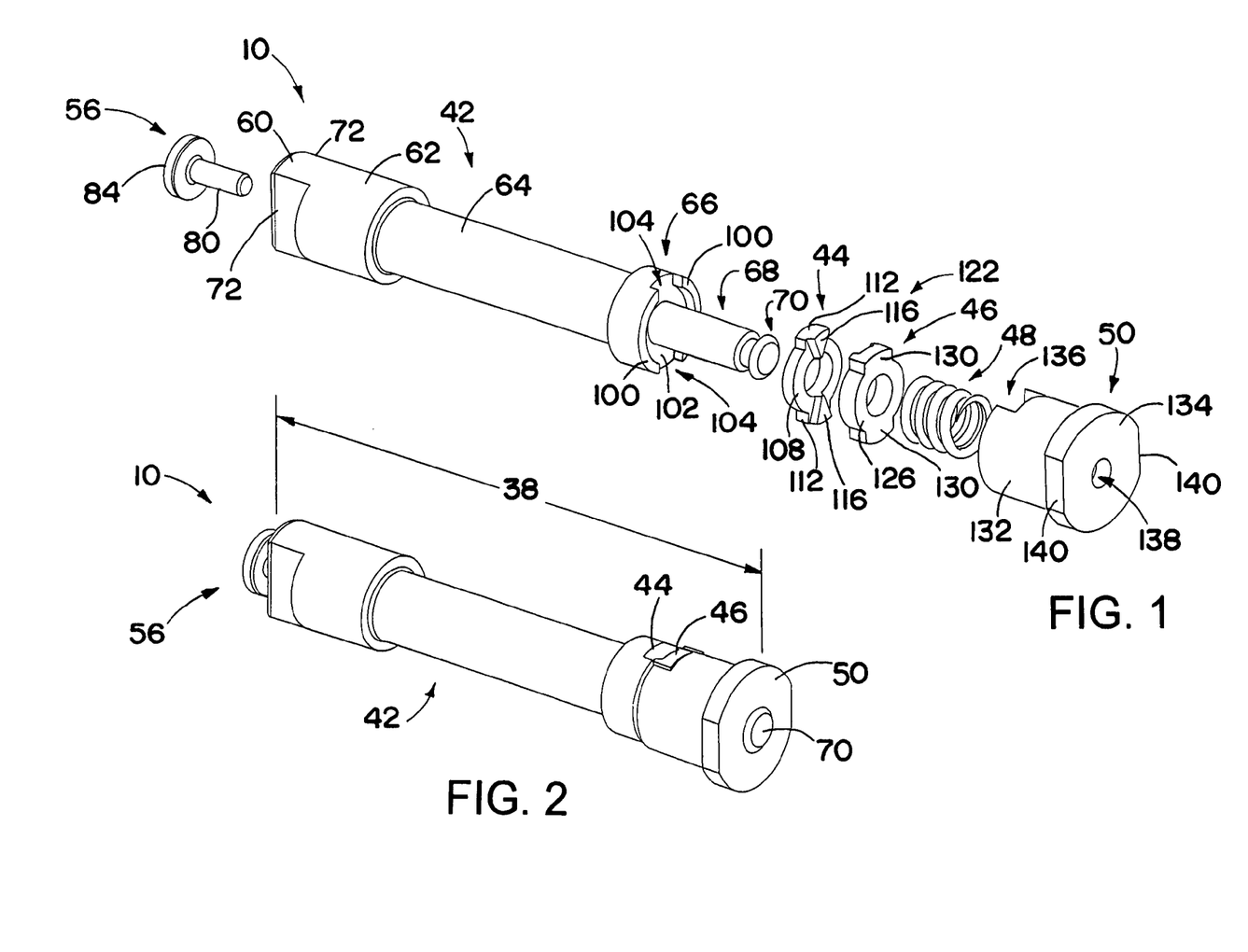
FIG. 1 is an exploded view of a hinge assembly in accordance with an embodiment of the present invention.
FIG. 2 is an oblique view of the hinge assembly of FIG. 1.

The hinge assembly 10 has a hinge assembly length 38 such that it extends most of the hinge connection width 30. The hinge assembly length 38 may be at least 90% of the hinge connection width 30. The hinge assembly length 38 may even be substantially the same as the hinge connection width 36, with the hinge assembly 10 extending from one end of the top half tube 24 to the opposite end of the bottom half tube 26.

The hinge assembly 10 includes a shaft 42, a shaft insert 44, a collar insert 46, a coil spring 48, and a collar 50. A flexible film connector 52 is wrapped around the shaft 42, and is used to make electrical connections between the halves 14 and 16 of the electronic device 20. A retaining pin 56 is used to the aid in securing the hinge assembly 10 within the tubes 24 and 26. Details and interoperability of these parts will now be described.

Figure 5:
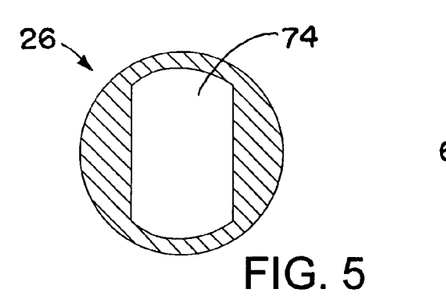
FIG. 5 is a cross-sectional view of the bottom tube of the hinge mechanism of FIG. 3, along section 5-5 of FIG. 4.

Proceeding axially from one end to the other, the shaft 42 includes a keyed end 60, a round shaft portion 62, a central shaft portion 64 with reduced radius, an insert-receiving portion 66, a through portion 68, and a stakable end 70. The keyed end 60 has a pair of flat faces 72 parallel and diametrically opposed to one another. The keyed end 60 is used to engage a corresponding keyed passage 74 in the bottom tube 26, shown in FIGS. 3 and 5. This prevents the shaft 42 from rotating relative to the bottom tube 26.

Figure 3:
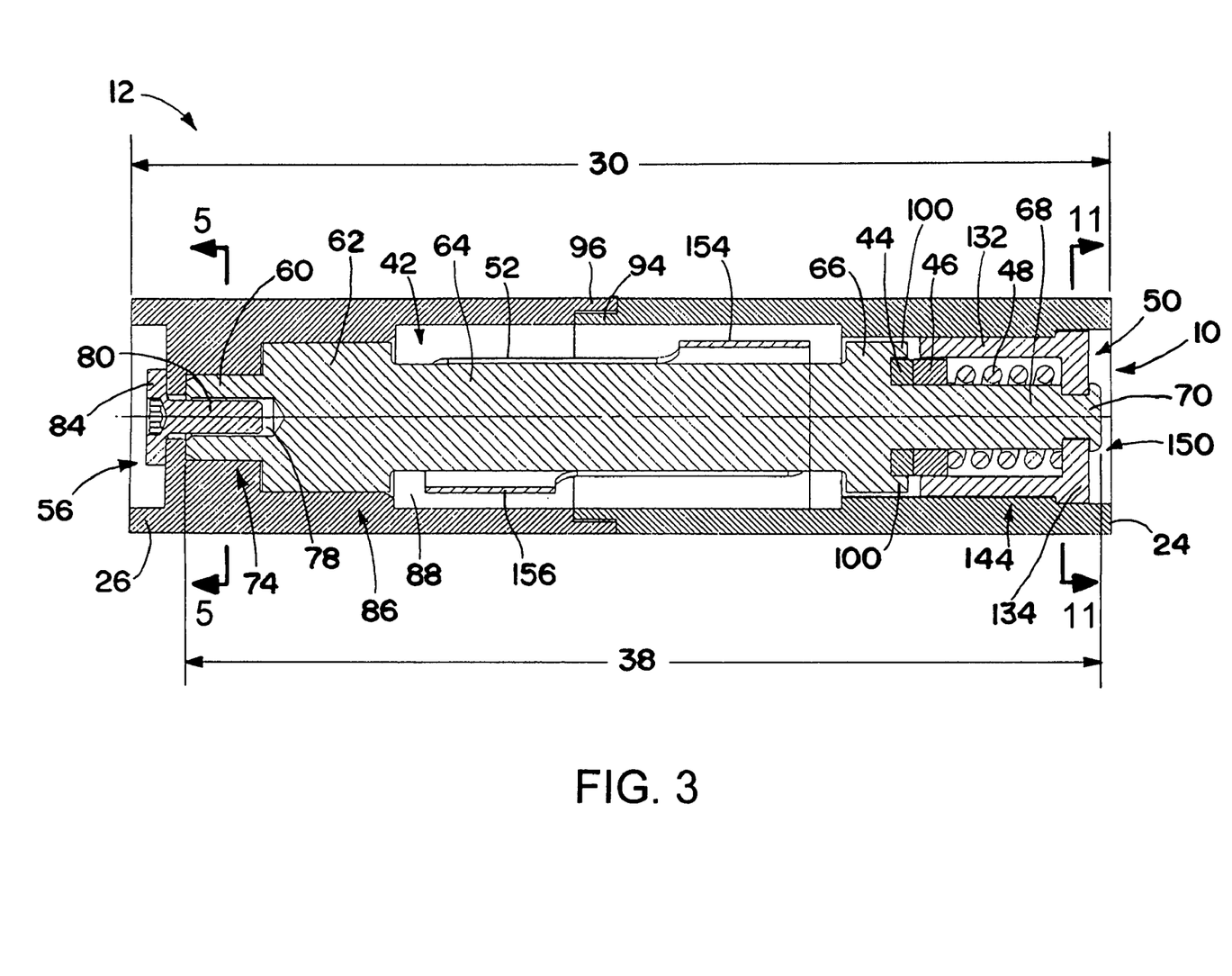
FIG. 3 is a side cross-sectional view of an electronic device that includes a hinge mechanism that in turn includes the hinge assembly of FIG. 1.
Figure 6:
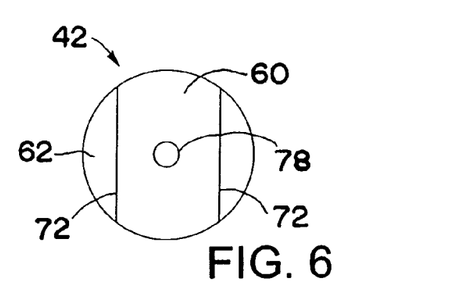
FIG. 6 is an end view of a shaft of the hinge assembly of FIG. 1.

With reference now in addition to FIG. 6, the keyed end 60 has a central hole 78 at the axis of the shaft 42. The central shaft hole 78 receives a round protruding rod 80 of the retaining pin 56. The retaining pin protruding pin rod 80 is threadedly into the threaded central shaft hole 78. The protruding pin rod 80 may be otherwise secured to the hole 80, such as be use of a suitable adhesive. This engagement is accomplished through a tube through hole 82 in the bottom tube 26 (FIG. 3). The hole 82 allows the retaining pin protruding rod 80 to pass through, but is not wide enough to allow a wider retaining pin flange 84 to pass through. Thus retaining pin 56 is used to secure the shaft 42 and the other parts of the hinge assembly 10 in place within the bottom tube 26.

The round shaft portion 62 of the shaft 42 is press fit into a corresponding narrowed press fit round passage 86 (FIG. 3) in the bottom tube 26. Adjacent to the shaft portion 62 is the central shaft portion 64. The central shaft portion 64 has a smaller radius than the round shaft portion 62. The central shaft portion 64 is located in a central tube passage 88 (FIG. 3) in the tubes 24 and 26. The flexible film 52 is wrapped around the central shaft portion 64 within the central tube passage 88. As mentioned above, the flexible film 52 is a plastic ribbon film having an array of conductors for making electrical connections between components of the halves 14 and 16 of the electronic device 20.

The tubes 24 and 26 interfit together, and have respective overlapped ends 94 and 96 at the middle of the central passage 88. The top tube end 94 is shown as radially inward of the bottom tube end 96, but it will be appreciated that the overlap may be made the opposite way. The overlap of the ends 94 and 96 helps prevent dust, liquids, and other contaminants from getting into the central passage 88.

Further along the shaft 42, the insert-receiving portion 66 is configured for receiving the shaft insert 44. The insert-receiving portion 66 has a pair of diametrically-opposed curved retaining protrusions 100 bracketing a recess 102. The curved protrusions 100 are portions of an annulus, circumferentially separated from one another by a pair of diametrically-opposed cutouts 104. The curved protrusions 100 thus have the shape of a pair of parentheses.

The narrow diameter shaft through portion 68 protrudes in an axial direction from the insert-receiving portion 66. The through portion 68 passes through the center of the shaft insert 44, the collar insert 46, and the coil spring 48.

The through portion 68 concludes at a stakable end 70. The end 70 may be staked to secure the shaft assembly 10 within the tubes 24 and 26. It will be appreciated that alternatively other suitable securing mechanisms may be used, such as a locking ring to secure the end 70.

The shaft 42 may have an overall shaft length that is substantially the same as the hinge assembly length 38. In other words, the shaft 42 may extend in an axial direction fully from one side of the hinge assembly 10 to the opposite side of the hinge assembly 10.

The shaft 42 may be made of any of a variety of suitable materials. Examples of suitable materials for the shaft 42 are glass-fiber-reinforced plastics and die cast magnesium.

Figure 7:
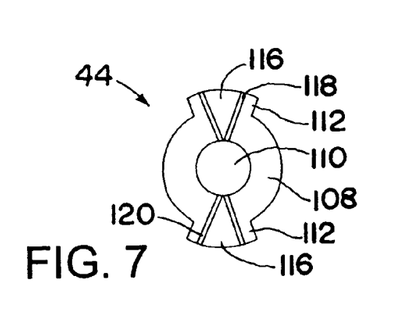
FIG. 7 is a plan view of a shaft insert of the hinge assembly of FIG. 1.
Figure 8:
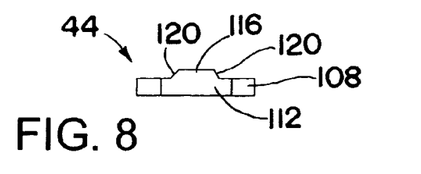
FIG. 8 is a side view of the shaft insert of FIG. 7.

Referring now in addition to FIGS. 7 and 8, the shaft insert 44 has an annular body 108 surrounding a through hole 110, which is sized to allow the shaft through portion 68 to pass therethrough. The shaft insert 44 has a pair of radial protrusions 112 that extend radially outward from the body 108 in diametrically opposed directions. The radial protrusions 112 correspond in shape and size to the cutouts 104 in the insert-receiving portion 66. Thus the shaft insert 44 does not rotate relative to the shaft 42.

The shaft insert 44 has a pair of diametrically-opposed wedge-shape raised portions or protrusions 116. The wedge-shape protrusions 116 are raised in an axial (longitudinal) direction from the annular body 108 and the radial protrusions 112, toward the collar insert 46. The wedge protrusions 116 have radially-inward narrow ends abutting the through hole 110, and widen outward to reach their maximum width at the radially outward edge of the radial protrusions 112. The wedge protrusions 116 each have sloped sides 118, sloping in a generally circumferential direction.

Figure 9:
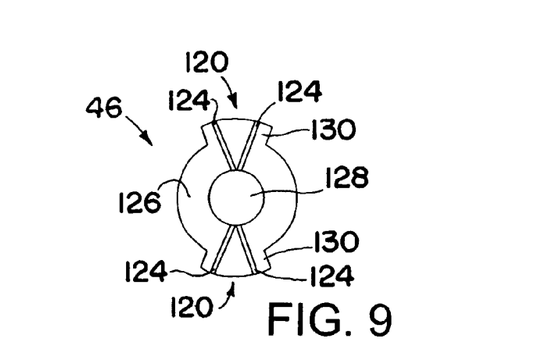
FIG. 9 is a plan view of a collar insert of the hinge assembly of FIG. 1.
Figure 10:
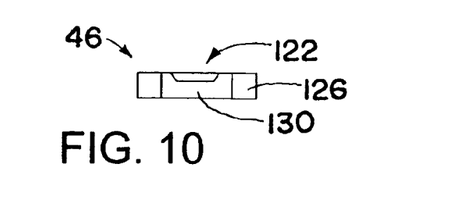
FIG. 10 is a side view of the collar insert of FIG. 9.

With reference now in addition to FIGS. 9 and 10, the wedge protrusions 116 cooperate with detent recesses 120 in the collar insert 46 to form a detent mechanism 122 that releasably locks the hinge connection 12 in one of two positions. The detent recesses 120 have a wedge shape corresponding to that of the wedge protrusions 116, including having sloped walls 124 that match up with the sloped sides 118 of the wedge protrusions 116. The collar insert 46 has an annular body 126 with a central through hole 128. Collar insert radial protrusions 130 extend radially outward from the collar insert body 126. The collar insert radial protrusions 130 may have substantially the same size and shape as the shaft insert radial protrusions 112.

The inserts 44 and 46 may be made of any of a variety of suitable materials. Example suitable materials are forged steel and polyoxymethylene (POM) material.

Figure 11:
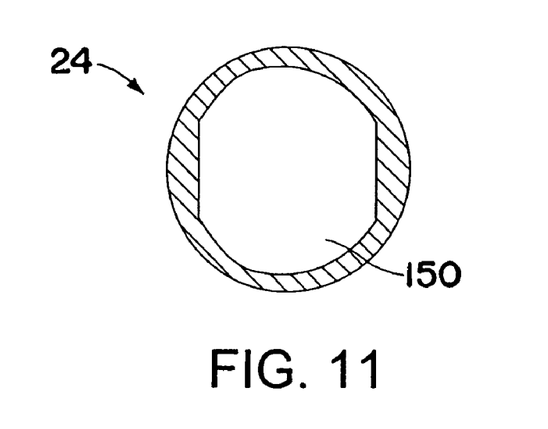
FIG. 11 is a cross-sectional view of the top tube of the hinge mechanism of FIG. 3, along section 11-11 of FIG. 4.

The coil spring 48 biases the collar insert 46 to engage the shaft insert 44. The spring 48 fits into a hollow cylindrical portion 132 of the collar 50, and presses against both the collar insert 46 and an end portion 134 of the collar 50. The collar cylindrical portion 132 includes a pair of cutouts 136 for receiving the collar insert radial protrusions 130, thus preventing the collar insert 46 from rotating relative to the collar 50. The collar cylindrical portion 132 engages a press fit passage 144 (FIG. 3) in the top half tube 24. The collar end portion 134 has a collar through hole 138 and a pair of diametrically-opposed flat side surfaces 140. The flat surfaces 140 engage corresponding flat inner surfaces 148 (FIG. 11) of a passage 150 in the top half tube portion 24. This prevents the collar 50 from rotating relative to the top half 14. The collar 50 may be made of any of a variety of suitable materials, such as plastics or die cast magnesium.

The central tube passage 88 (FIG. 3) is sealed from outside contaminants by the overlapped ends 94 and 96 of the tubes 24 and 26, the press fit connection between the shaft keyed end 60 and the keyed passage 74, and the press fit connection between the collar cylindrical portion 132 and the passage 144. This protects the flexible film 52 and the electrical components of the electronic device 20 from various solid and liquid contaminants that could interfere with proper operation.

In operation, the bottom half 16, the shaft 42, and the shaft insert 44 move together as a unit, rotating relative to the top half 14, the collar 50, and the collar insert 46, which also move together as a unit. The coil spring 48 urges engagement of the detent mechanism 122 that includes the wedge protrusions 116 and the corresponding detent recesses 120. This releasably secures the electronic device 20 in an open or closed position. Sufficient force can be used to overcome the detent mechanism 122, allowing the wedge protrusions 116 to slide out of the detent recesses 120 against the biasing force of the coil spring 48.

Figure 4:
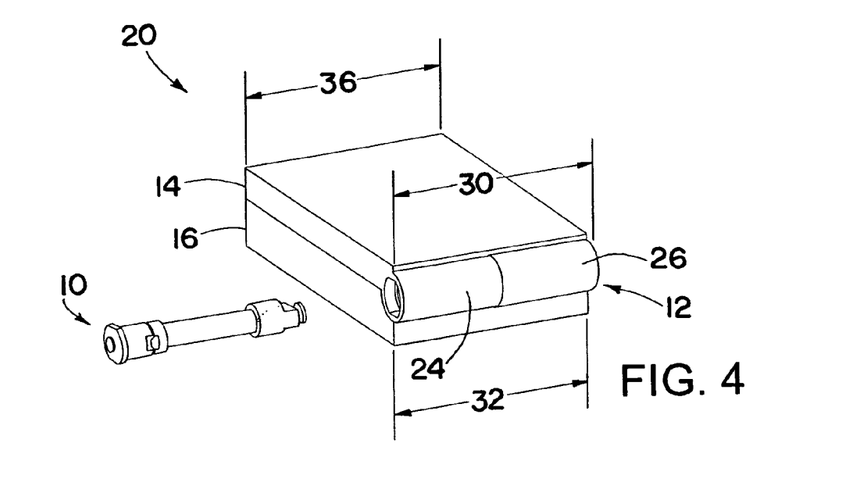
FIG. 4 is an oblique view illustrating the assembly of the hinge mechanism of FIG. 3.

FIG. 4 illustrates the assembly procedure of the hinge connection 12 of the electronic device 20. First the hinge assembly 10 is assembled, with the shaft 42 passed through the shaft insert 44, the collar insert 46, and the coil spring 48, and then secured to the collar 50. The hinge assembly 10 is then inserted into the tubes 24 and 26, into the top half tube 24 first. The hinge assembly 10 is inserted into the tubes 24 and 26 as far as possible, until the shaft 42 reaches the end of the keyed passage 74. In inserting the hinge assembly 10 the shaft portion 62 is press fit into the round tube passage 86, and the collar cylindrical portion 134 is press fit into the round tube passage 144. After insertion of the hinge assembly 10, the shaft end 70 is staked. The retaining pin 56 is then inserted through the tube through hole 82 and is secured in the hole 68 of the shaft 42.

Figure 12:
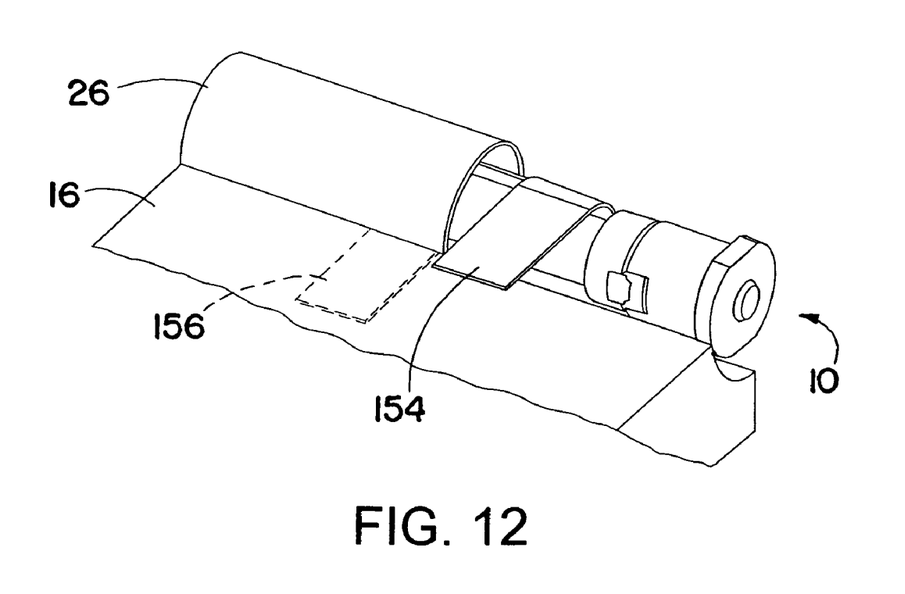
FIG. 12 is an oblique view of parts of the electronic device of FIG. 3, illustrating the ends of the flexible film of the hinge assembly.

As illustrated in FIG. 12, ends 154 and 156 of the flexible film 52 are pulled out of the tubes 24 and 26, through slots and into the device halves 14 and 16, respectively, to be connected to components in the halves 14 and 16. (The top half 14 is omitted in FIG. 12 for illustration purposes.) The flexible film 52 may be pre-bent to fit into the tubes 24 and 26. The assembly may occur by first inserting the shaft assembly 10 into one of the tubes 24 and 26, followed by fully assembling the corresponding device half 14 or 16, including connecting the appropriated flexible film end 154 or 156. The other of the device halves 14 and 16, in a partially assembled state, is then slipped onto the shaft assembly 10. Electrical connections are then made with the appropriate flexible film end, and the device half assembly is completed, such as by attaching a cover piece.

The hinge connection 12 may have of a large range of sizes. According to an example embodiment, the hinge connection may have a width of 45 mm and a diameter of 11 mm.

It will be appreciated that a wide range of variations on the described embodiment may be made. For example, the features of the top half tube 24 and the bottom half tube 26 may be switched. As another example, multiple parts may be combined in a single part, or a single part may be split into multiple parts.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A mobile radio terminal electronic device comprising:
   a top half fixedly attached to a top half tube;
   a bottom half fixedly attached to a bottom half tube; and
   a hinge connection between the top half and the bottom half, wherein the hinge connection includes:
      the top half tube;
      the bottom half tube; and
      a hinge assembly extending into the top half tube and the bottom half tube;
   wherein the top half tube and the bottom half tube together extend across substantially all of a hinge connection width of the hinge connection, wherein the hinge connection width is from a first end of the hinge connection to a second, opposite end of the hinge connection, in an axial direction along a longitudinal axis of the tubes;
   wherein the top half tube rotates about the longitudinal axis relative to the bottom half tube;
   wherein the hinge assembly includes:
      a shaft;
      a collar around the shaft;
      a detent mechanism that engages to releasably secure the hinge assembly with the top half positioned relative to the bottom half in an open position, and to alternatively releasably secure the hinge assembly with the top half positioned relative to the bottom half a closed position, wherein the detent mechanism includes a protrusion on a first part of the hinge assembly engaging a recess on a second part of the hinge assembly; and
      a coil spring around the shaft; and
   wherein the coil spring biases the detent mechanism toward engagement.

2. The electronic device of claim 1, wherein the hinge connection width is substantially the same as a local width of the electronic device at an end of the electronic device where the hinge connection is located, in the axial direction.

3. The electronic device of claim 1, wherein the hinge connection width is substantially the same as an overall width of the electronic device, in the axial direction.

4. The electronic device of claim 1, wherein the hinge assembly has a hinge assembly length in the axial direction that is at least 90% of the hinge connection width.

5. The electronic device of claim 1, wherein the hinge assembly is secured in the tubes by a retaining pin.

6. The electronic device of claim 1, wherein the top half tube and the bottom half tube interfit together with overlapped ends.

7. The electronic device of claim 6, wherein the hinge assembly is press fit into respective passages in both the top half tube and the bottom half tube.

8. The electronic device of claim 7,
   further comprising a flexible film electrical connector that electrically coupled the top half and the bottom half;
   wherein the flexible film connector runs through a central tube passage within and defined by the tubes.

9. The electronic device of claim 8, wherein the central tube passage is enclosed by the overlapped ends of the tubes, by a first press fit connection between the hinge assembly and the top half tube, and by a second press fit connection between the hinge assembly and the bottom half tube.

10. The electronic device of claim 8, wherein the flexible film electrical connector wraps around a shaft of the hinge assembly that extends into both the top half tube and the bottom half tube.

11. The electronic device of claim 10, wherein the flexible film electrical connector wraps around a narrowed central portion of the shaft that is narrower than adjoining shaft portions at respective ends of the narrowed central portion.

12. The electronic device of claim 1, wherein the shaft is press fit into one of the tubes, and the collar is press fit into the other of the tubes.

13. A mobile radio terminal electronic device comprising:
   a top half fixedly attached to a top half tube;
   a bottom half fixedly attached to a bottom half tube; and
   a hinge connection between the top half and the bottom half, wherein the hinge connection includes:
      the top half tube;
      the bottom half tube; and
      a hinge assembly extending into the top half tube and the bottom half tube; and
   wherein the top half tube and the bottom half tube together extend across substantially all of a hinge connection width of the hinge connection, wherein the hinge connection width is from a first end of the hinge connection to a second, opposite end of the hinge connection, in an axial direction along a longitudinal axis of the tubes;
   wherein the top half tube rotates about the longitudinal axis relative to the bottom half tube;
   wherein the hinge assembly includes:
      a shaft;
      a collar around the shaft;
      a detent mechanism that engages to releasably secure the hinge assembly with the top half positioned relative to the bottom half in an open position, and to alternatively releasably secure the hinge assembly with the top half positioned relative to the bottom half a closed position; and
      a coil spring around the shaft;
   wherein the coil spring biases the detent mechanism toward engagement;
   wherein the detent mechanism includes:
      a shaft insert that fits into a recess in a portion of the shaft; and
      a collar insert that fits into a pair of cutouts in the collar; and wherein one of the inserts has at least one raised shape that releasably engages at least one shaped recess in the other of the inserts.

14. The electronic device of claim 13, wherein the at least one raised shape includes a wedge shape protrusion, and the at least one shaped recess includes a wedge shape recess.

15. The electronic device of claim 13, wherein the hinge connection width is substantially the same as a local width of the electronic device at an end of the electronic device where the hinge connection is located, in the axial direction.

16. The electronic device of claim 13, wherein the hinge connection width is substantially the same as an overall width of the electronic device, in the axial direction.

17. The electronic device of claim 13, wherein the hinge assembly has a hinge assembly length in the axial direction that is at least 90% of the hinge connection width.

18. The electronic device of claim 13, wherein the hinge assembly is secured in the tubes by a retaining pin.

19. The electronic device of claim 13, wherein the top half tube and the bottom half tube interfit together with overlapped ends.

20. The electronic device of claim 19,
wherein the hinge assembly is press fit into respective passages in both the top half tube and the bottom half tube; and
wherein the central tube passage is enclosed by the overlapped ends of the tubes, by a first press fit connection between the hinge assembly and the top half tube, and by a second press fit connection between the hinge assembly and the bottom half tube.

\* \* \* \* \*